July 10, 1951
H. W. HAPMAN
2,559,615
CONVEYER BUCKET
Filed Dec. 29, 1945
2 Sheets-Sheet 1
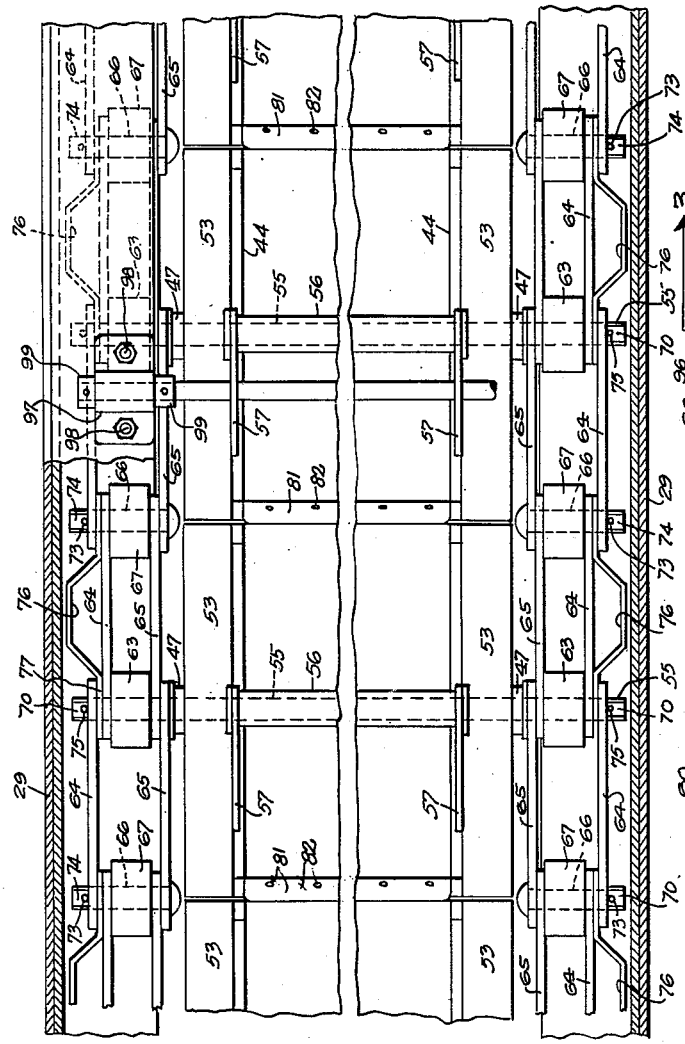
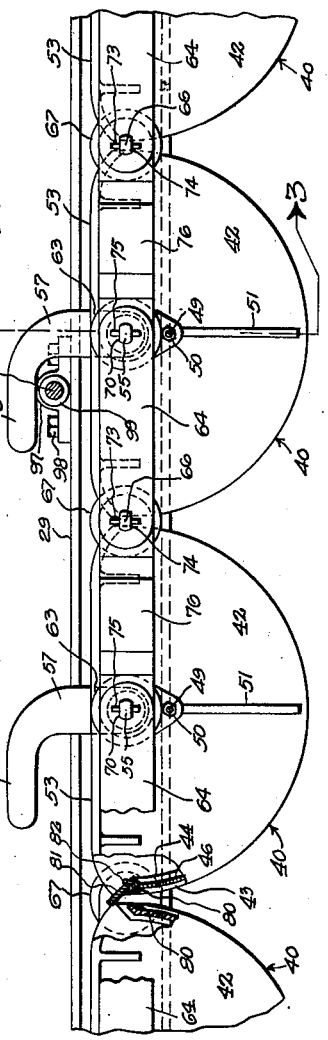
INVENTOR.
Henry W. Hapman
BY
Barthel & Bugbee
ATT'YS

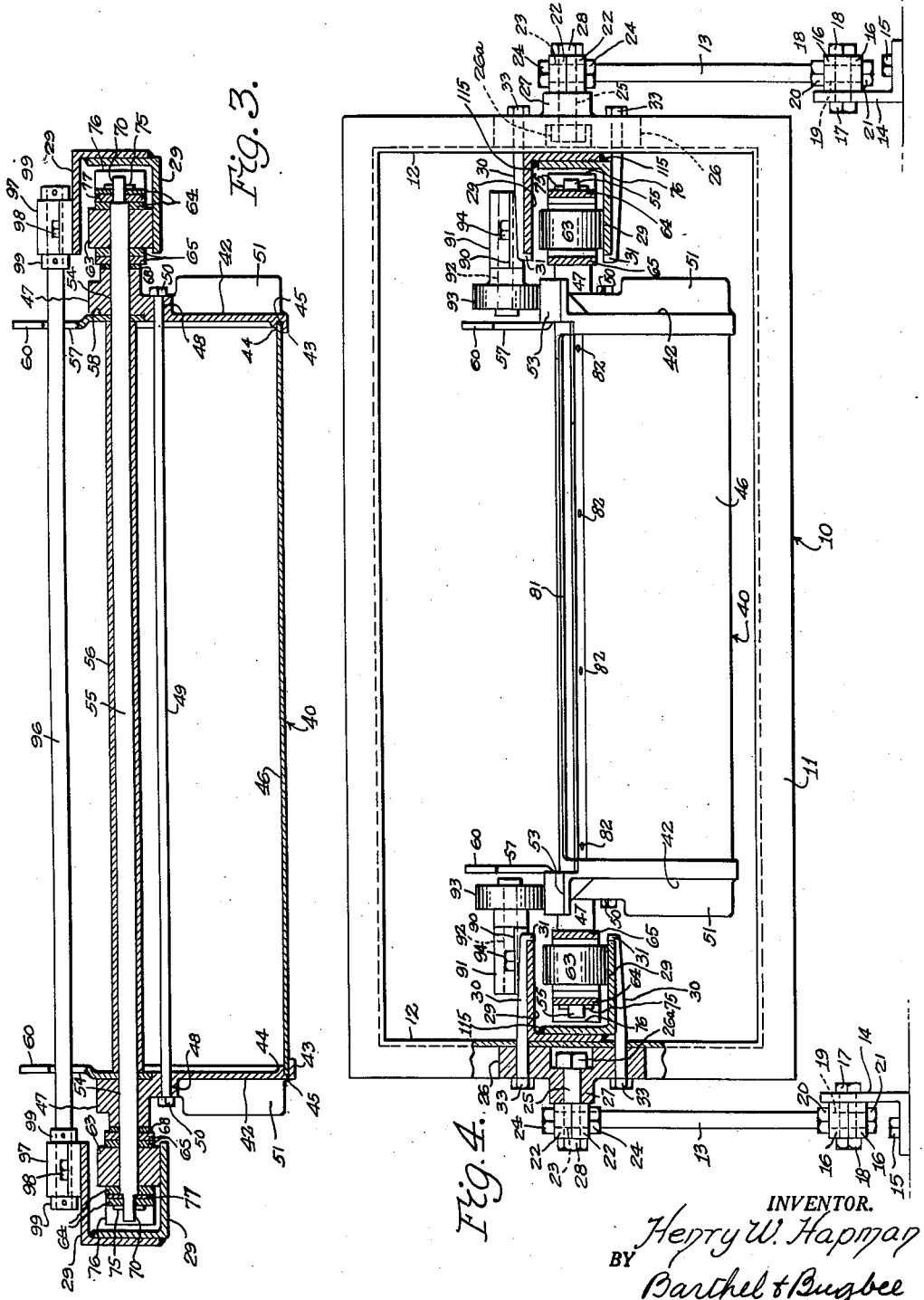

Patented July 10, 1951

2,559,615

UNITED STATES PATENT OFFICE 2,559,615

CONVEYER BUCKET

Henry W. Hapman, Detroit, Mich., assignor, by mesne assignments, of forty per cent to Hannah J. Hapman, Detroit, Mich.

Application December 29, 1945, Serial No. 638,138

4 Claims. (Cl. 198—148)

The present invention relates to conveyors, and more particularly to bucket type conveyors.

One object of the invention is to provide a unique bucket construction for conveyors which comprises comparatively few parts which may be easily assembled without requiring the use of skilled labor or technicians.

Another object is to provide a bucket with means for maintaining the buckets of the conveyor in a horizontal position during the loading thereof so that the buckets will be prevented from tilting and the resultant displacement of the material therefrom.

Another object is to provide a conveyor bucket structure having means carried by one edge for engaging an adjacent bucket and sealingly spaced therebetween so as to further prevent the passage of the material between the buckets during the loading thereof.

Other objects and advantages of the invention will become apparent during the course of the following description of the accompanying drawings, wherein:

Figure 1 is a top plan view of an assembly of buckets in one of the conveyor horizontal runs showing portions thereof broken away to illustrate the manner in which the conveyor buckets are guided by the opposite channel guide tracks or ways;

Figure 2 is a side elevation of the bucket assembly shown in Figure 1, illustrating the relative positions of the conveyor bucket and partly broken away to show in detail the sealing strip between adjacent buckets;

Figure 3 is a vertical cross-sectional view taken on line 3—3 of Figure 2 looking in the direction of the arrows and further illustrating the structure of the conveyor bucket and showing the manner in which one of the tripper rods is positioned between the conveyor channel guides; and Figure 4 is a vertical cross-section through the bucket assembly of Figure 1, showing a bucket in side elevation and further illustrating one of the frame structures for supporting the conveyor guide tracks.

This application is a division of my co-pending application, Serial No. 460,337 filed October 1, 1942, upon a Conveyor, which has since matured into United States Patent No. 2,426,304 issued August 26, 1947.

Referring to the drawings in detail, as shown in Figure 4, a series of brackets 10 are positioned on the floors and walls of the building in spaced relation for the purpose of supporting the runs of the conveyor, and each of the brackets 10 comprises a rectangular-shaped frame having side bars 11 connected at the ends by transversals 12. The side and end bars are preferably formed of channel-shaped bars to facilitate the easy manipulation and arrangement of the various parts of the conveyor. Each of the rectangular supporting frames 10 is adapted to be supported from the walls or floors of the building by means of a pair of spaced supporting bars 13, the inner ends of which are adapted to be connected to suitable angle brackets 14 fastened to the wall or floor by suitable bolts or the like, as at 15. Angle brackets 14 are placed in opposed relation for receiving a pair of spaced blocks 16 having complementary cut-away portions for receiving a bolt 17 which extends therethrough and likewise extends through the angle bracket 14. Threaded on the end of the bolt 17 is a nut 18 to securely clamp the blocks 16 in position. Each of the blocks 16 is bored as at 19 to receive the rods 13, and said rods are secured in position by means of nuts 20 and 21 threaded thereon in spaced relation one from the other. The free ends of the rods 13 extend through similar blocks 22 having transverse apertures 23 in alignment, whereby the free threaded ends of the rods 13 may extend through the apertures 23 and may be fastened in place by nuts 24 clampingly engaging the blocks 22. The blocks 22 are likewise formed with complementary cut-away portions to provide an opening for receiving a bolt 25, the head of which as at 26a is adapted to be received in an opening formed in the block 26 so that the shank of the bolt will extend through an integral projection 27 formed on the block 26. It is intended to provide each end bar 12 with supporting rods 13 and to facilitate this, the blocks 26 are formed of a width equal to the width of the channel bars from which the end members 12 are formed, so that the blocks will fit between the flanges thereof, as is shown clearly in Figure 4. A nut 28 may be threaded on the opposite end of the bolt 25 to securely hold the blocks 22 in position.

The channelways or guides for the bucket conveyor are formed of angle bars 29 arranged with their flanges projecting inwardly toward the flanges of the opposite guides. The angle bars 29 are adapted to be held in position by means of hub bolts 30 having one end as at 31 hooked over the free edge of the channel flange so that the opposed end ways extend through suitable openings in the end channel bars 12 and blocks 26, whereupon nuts or the like, as at 33, may be threaded thereon for clamping the channel guideways formed by the angle bars 29 and the blocks 26 to the end bars or channel members 12. This construction facilitates the supporting means, wherein the rectangular supporting frames 10 may be adjusted to any desired position to accommodate variously positioned conveyor runs. The nuts 28 may be loosened and the frame shifted to any desired angle position during the assembly or setting up of the conveyor.

The conveyor is formed of a series of buckets, generally indicated by the reference character 40, connected by a link chain subsequently to be described. Each of the buckets 40 comprises a pair of identically formed end members 42 which are semi-circular in shape and are adapted to be arranged in opposed relation, as shown clearly in Figure 3. The inner wall of each of the end plates 42 is provided with a marginal rib or flange 43 in spaced relation from a similar flange 44, thereby providing a groove 45 for receiving a flexible sheet of material 46. The flexible sheet 46 may be formed of a piece of perforated or screen material, if desired. The end edges of the flexible sheet of material 46 are seated in the grooves 45, and said flexible member 46 may be formed of relatively light material having considerable rigidity, such as phenolic condensation products or other material possessing the desired special characteristics.

Further, each of the semi-circular end walls 42 is provided with an enlarged hub portion 47 formed integral with the end walls and in alignment with the axis of the bucket. Each of the end walls is provided with an opening 48 formed in said hub portion, through which extends a rod 49 having the opposite ends threaded for receiving retaining nuts 50, so that the end walls 42 may be drawn tightly against the transverse edges of the flexible curved sheet 46. Each of the end walls is likewise provided with a wing portion 51 which extends radially from the hub portion 47 and forms a web for re-enforcing and strengthening the side walls 42 as well as providing a dumping means. The top edge of each of the end walls 42 is provided with a guide rib 53, likewise integral with the end wall for reinforcing the same in a direction at right angles to the wings or ribs 51.

The hub portions 47 are also provided with aligned openings 54 for receiving a transversely extending supporting rod 55, and said rod 55 extends through a spacing sleeve 56 having its ends abutting the bucket tripping members 57, as is clearly illustrated in Figures 2 and 3. The bucket tripping members 57 are received in cutaway recesses 58 formed in the opposite portions of the hubs 47 so that the sleeve 56 will urge the tripping arms 57 into position when the tie rod 49 is tightened to draw the end walls 42 together. It is intended to provide each of the end walls 42 on its inner side with said cutaway portions 58 for receiving the tripping arms 57 and said tripping arms are intended to be shaped at their inner ends to conform to the shape of the cut-away or depressed portion 58. The buckets thus formed provide a substantially rigid structure capable of withstanding considerable weight, and it is to be noted that the buckets are balanced by reason of the material being carried well below the supporting rod 55. The tripping arms 57 may have their free ends extending at right angles as at 60, or if desired, they may be positioned so as to provide oppositely extending arms, whereby the buckets may be tilted or dumped while travelling in either direction. Likewise, the ends of the arms 57 may be angularly formed so that the buckets may be tilted or dumped at the unloading station while travelling in an inclined runway. It is intended to provide a series of differently shaped tripper arms 57 so that they may be interchanged, depending upon the dumping positions and the unloading stations. The tripping arms 57 may be easily interchanged by simply removing the nuts 50 and withdrawing the supporting rod 55 for the positioning of the proper tripping arms. Likewise, broken bucket parts may be similarly interchanged, thereby eliminating the loss of time for replacing the parts and assembling the conveyor structure to the desired form.

The free ends of each of the supporting rods 55 are provided with rollers 63, and positioned on each side of the rollers are spaced outer chain links 64 and inner chain links 65. The rollers 63 are so positioned as to be guided in the channel way or guide formed by the angle bars 29 and the alternate ends of the inner and outer chain links 65 and 64 respectively are provided with connecting pins 66, likewise having rollers 67 guided in the channel ways formed by the angle bars 29. A washer or the like, as at 68 (Figure 3) may be interposed between the inner chain links and the hubs 47 to prevent the chain links 65 and 64 from moving inwardly. The free ends of each of the supporting bars 55 are flattened as at 70 to provide a shoulder between it and the remainder of the bar 55 as shown clearly in Figure 3. Alternate inner links of the outside sets 64 and 65 are provided with slotted openings so as to limit the inward movement of the outermost links and to prevent the links from becoming tightened upon the rods. The inner links 65 are both provided with round apertures and connect the bucket-supporting rods 55 for free swinging movement thereon. The inner and outer links 64 and 65 are interconnected and retained in position by the pin 66 having a cotter key or the like 73 (Figure 1) and each of the pins 66 is likewise flattened as at 74 similar to the rods 55 so as to prevent inward movement of the links 64 and 65 on the pin 66. Cotter keys or pins 75 extend through openings in the extreme free ends of the bucket-supporting rods 55 to prevent displacement of the links and the rollers 63.

In order to prevent endwise play of the buckets during their travel between the channel guides formed by the angle bars 29, slide shoes 76 are interposed between adjacent outer links 64. The shoes 76 are provided with angularly bent foot portions 77 suitably apertured for receiving alternate sets of supporting rods 55 and connecting pins 66. It is to be noted that the hub 47 of each bucket end wall projects outwardly a considerable distance in the form of a reduced hub portion so as to adequately space each of the buckets 40 and thereby prevent endwise play as well as to position the chain links 64 and 65 a sufficient distance so that the wings 51 on the end walls 42 will not be obstructed during the turning movement or tilting of the buckets.

It is to be noted that the transverse edges of the flexible members 46 are angularly bent to form lips 80, and one edge of each bucket is provided with a flexible sealing member 81 fastened in place by means of equi-distantly spaced rivets 82 (Figure 2) or the like, and said flexible strips 81 are arranged so as to partially overlap the lips 80 of an adjacent bucket and thereby seal the space between the buckets to prevent material from falling therebetween to the floor or ground.

By reason of the fact that the sealing strips 81 are only mounted on one edge or lip of each bucket, the buckets are allowed to tilt in either direction, depending upon the movement of the conveyor chains.

Supported on the channel guideways 29 are suitable brackets 90, each having a bearing portion 91 for receiving a spindle 92 on the outer end of which is rotatably mounted a roller 93 positioned above the roller guide 53 of each bucket so that the buckets will be maintained in a horizontal position as they travel beneath the filling hoppers. It is intended to position the rollers 93 in spaced relation so that the ribs 53 of the buckets will be engaged by at least two rollers 93 during their travel beneath the filling station or hopper. The brackets 90 may be held in place on the channel guideways 29 by means of suitable bolts 94.

After the loaded buckets have moved to an upper horizontal conveyor run, they may be dumped at an unloading station into a hopper (not shown) by means of the tripping arms 57. Directly above the hopper and supported between the channel guideways 29 (Figure 3) is a tripper rod 96 having its free ends rotatably supported in bearing brackets 97 fastened in place by machine screws or the like as at 98. Retaining collars 99 are secured to the ends of the rod 96 in spaced relation thereon so as to be positioned on opposite sides of the brackets 97 and thereby prevent endwise movement of the trip rod 96. As the free ends 60 of the trip arms 57 engage the rod 96, the buckets are tilted and rocked so that the contents will fall into the hopper.

For consideration of the operation of the invention, it will be assumed that the channel ways formed by the angle bars 29 have been adequately supported by means of the brackets 10 located at equally distant points. The motor (not shown) is started to cause the bucket conveyor, including the chains and buckets 40 to travel. The hopper is filled with material and controlled to allow the material to be dispensed into the buckets as they are travelling the area beneath the hopper, and during their travel through this area, the rollers 93 engage the roller track way 53 at each end of the bucket and maintain the same in a horizontal position against tilting or tipping.

As the loaded buckets reach the upper horizontal course above the floor, they may be tripped at the dumping station or hopper by means of the bar 96 engaging the tripping arms 60. Should it be desired to dump the loaded buckets at a different location, the trip bar 96 is removed to allow the loaded buckets to continue to another station or hopper.

While I have shown and described my invention in detail, it is to be understood that the same is to be limited only by the appended claims, for many changes may be made without departing from the spirit and scope of my invention.

What I claim is:

1. A conveyor bucket unit for mounting between spaced parallel endless conveyor chains, said unit comprising a pair of spaced end members, a trough-shaped sheet member secured at its opposite ends to said end members, a supporting rod extending between and through said end members and pivotally engaging said end members, the opposite ends of said supporting rod being adapted to be connected to said conveyor chains, a spacing and protecting sleeve surrounding said supporting rod and extending between said end members, and a tie rod extending between and interconnecting said end members, said tie rod being disposed below said supporting rod and arranged parallel thereto.

2. A conveyor bucket unit for mounting between spaced parallel endless conveyor chains having pivoted links and rollers, said unit comprising a pair of spaced end members, a trough-shaped sheet member secured at its opposite ends to said end members, a supporting rod extending between and through said end members and pivotally engaging said end members, and a spacing and protecting sleeve surrounding said supporting rod and extending between said end members, said supporting rod projecting outwardly in opposite directions beyond said end members a distance adapted to span between and beyond said conveyor chains, the outer portions of said rod being configured as axles to pivotally receive a roller and links of each chain, and the ends of said rod having fastener attachment portions thereon for retaining said links and roller in position.

3. A conveyor bucket unit for mounting between spaced parallel endless conveyor chains, said unit comprising a pair of spaced end members, a trough-shaped sheet member secured at its opposite ends to said end members, and an elongated flexible sealing strip of elastic deformable material extending along one longitudinal edge of said trough-shaped sheet member and inclined upwardly and outwardly therefrom transversely to said trough-shaped sheet member.

4. A conveyor bucket unit for mounting between spaced parallel endless conveyor chains, said unit comprising a pair of spaced end members, a trough-shaped sheet member secured at its opposite ends to said end members, and an elongated flexible sealing strip of elastic deformable material extending along one longitudinal edge of said trough-shaped sheet member and inclined upwardly and outwardly therefrom transversely to said trough-shaped sheet member, the opposite edge of said trough-shaped sheet member from the edge with said sealing strip having a lip engageable with the sealing strip on the adjacent bucket unit in overlapping relationship.

HENRY W. HAPMAN.

REFERENCES CITED

The following references are of record in the file of this patent:

UNITED STATES PATENTS

| Number | Name | Date |
| --- | --- | --- |
| 40,671 | Brooks | Nov. 24, 1863 |
| 217,580 | Burdine et al. | June 15, 1879 |
| 486,809 | McCaslin | Nov. 22, 1892 |
| 647,750 | Hunt | Apr. 17, 1900 |
| 664,427 | Peck | Dec. 25, 1900 |
| 981,961 | Wehmiller et al. | Jan. 17, 1911 |
| 1,090,156 | Kendall | Mar. 17, 1914 |
| 1,427,653 | Streich | Aug. 29, 1922 |
| 1,445,277 | Hansen | Feb. 13, 1923 |
| 2,200,507 | Kozak | May 14, 1940 |